(12) United States Patent
Drottar et al.

(10) Patent No.: US 6,181,704 B1
(45) Date of Patent: Jan. 30, 2001

(54) METHOD AND APPARATUS FOR INPUT/OUTPUT LINK RETRY, FAILURE AND RECOVERY IN A COMPUTER NETWORK

(75) Inventors: Ken Drottar; David S. Dunning; Donald F. Cameron, all of Portland, OR (US)

(73) Assignee: Intel Corporation, Santa Clara, CA (US)

(*) Notice: Under 35 U.S.C. 154(b), the term of this patent shall be extended for 0 days.

(21) Appl. No.: 09/141,136

(22) Filed: Aug. 27, 1998

Related U.S. Application Data

(60) Provisional application No. 60/057,221, filed on Aug. 29, 1997, and provisional application No. 60/081,220, filed on Apr. 9, 1998.

(51) Int. Cl.[7] .................................................. H04Q 11/04
(52) U.S. Cl. .................... 370/410; 370/231; 370/236; 370/400
(58) Field of Search ................................ 370/230, 231, 370/232, 236, 351, 389, 390, 400, 410, 412, 216, 228, 237, 428

(56) References Cited

U.S. PATENT DOCUMENTS

| | | | |
|---|---|---|---|
| 5,260,933 | 11/1993 | Rouse ...................................... | 370/14 |
| 5,459,725 | * 10/1995 | Bodner et al. ........................ | 370/390 |
| 5,809,025 | * 9/1998 | Timbs .................................. | 370/400 |
| 5,933,435 | * 8/1999 | Shah et al. ........................... | 370/232 |
| 5,959,995 | * 9/1999 | Wicki et al. ......................... | 370/351 |

* cited by examiner

Primary Examiner—Douglas W. Olms
Assistant Examiner—Shick Hom
(74) Attorney, Agent, or Firm—Kenyon & Kenyon

(57) ABSTRACT

A method for transmitting data in a network from a source node to a destination node includes the steps of transmitting data packets from the source node to an intermediary point, and assigning each of the packets a corresponding sequence number. A copy of each packet is stored in a buffer at the source node until receiving an acknowledgment that each packet was successfully received by the intermediary point. Upon successfully reaching the intermediate point, the intermediate point assigns an intermediate point sequence number to each packet. A copy of each packet is retained in a buffer at the intermediate point until receiving an acknowledgment that the packet was successfully received at the next delivery point. Once a particular packet is successfully received at an intermediary point, the particular packet is de-allocated at the source node, as are any other packets in the buffer between the particular packet and the last acknowledged packet. Upon receipt of an error indication, each packet is retransmitted along with all subsequent packets. At the receiving end, all received packets following the packet associated with the error indication are dropped until successfully receiving a retransmitted version of the packet. In addition, a single negative acknowledgment is used to indicate that a packet associated with the negative acknowledgment includes at least one error and to simultaneously indicate that all previous packets received prior to the packet associated with the negative acknowledgment were received correctly. Finally, a link sequence number is assigned to each of packet before transmitting it from a origination point in a link. Subsequently, each new link origination point assigns a sequence number that is independent from the sequence number assigned by the source node or the previous origination point.

20 Claims, 3 Drawing Sheets

METHOD AND APPARATUS FOR INPUT/ OUTPUT LINK RETRY, FAILURE AND RECOVERY IN A COMPUTER NETWORK

RELATED APPLICATIONS

This application claims priority to U.S. Provisional Application No. 60/057,221, filed on Aug. 29, 1997, entitled "Method and Apparatus for Communicating Between Interconnected Computers, Storage Systems, and Other Input/ Output Subsystems" by inventors Ahmet Houssein, Paul A. Grun, Kenneth R. Drottar, and David S. Dunning, and to U.S. Provisional Application No. 60/081,220, filed on Apr. 9, 1998, entitled "Next Generation Input/Output" by inventors Christopher Dodd, Alunet Houssein, Paul A. Grun, Kenneth R. Drottar, and David S. Dunning. These applications are hereby incorporated by reference as if repeated herein in their entirety, including the drawings. Furthermore, this application is related to U.S. Pat. application No. 09/141,151 filed by David S. Dunning and Kenneth R. Drottar on even date herewith and entitled "Method and Apparatus for Controlling the Flow of Data Between Servers." This application is also related to U.S. Pat. application No. 09/141,134 filed by David S. Dunning, Ken Drottar and Richard Jensen on even date herewith and entitled "Method and Apparatus for Controlling the Flow of Data Between Servers Using Optimistic Transmitter."

BACKGROUND OF THE INVENTION

The present invention relates generally to methods and apparatuses for controlling the flow of data between nodes (or two points) in a computer network, and more particularly to a method and apparatus for controlling the flow of data between two nodes (or two points) in a system area network.

For the purposes of this application, the term "node" will be used to describe either an origination point of a message or the termination point of a message. The term "point" will be used to refer to a transient location in a transmission between two nodes. The present invention includes communications between either a first node and a second node, a node and a switch, which is part of a link, between a first switch and a second switch, which comprise a link, and between a switch and a node.

An existing flow control protocol, known as Stop and Wait ARQ, transmits a data packet and then waits for an acknowledgment (ACK) before transmitting the next packet. As data packets flow through the network from one point to the next point, latency becomes a problem. Latency results from the large number of links and switches in fabrics which make up the network. This is because each packet requires an acknowledgment of successful receipt from a receiving node before the next data packet is sent from a transmitting node. Consequently, there is an inherent delay due to the transit time for the acknowledgment to reach the transmitting node from the receiving node.

One solution, which is known as Go Back n ARQ, uses sequentially numbered packets, in which a sequence number is sent in the header of the frame containing the packet. In this case, several successive packets are sent without waiting for the return of the acknowledgment. According to this protocol, the receiving node only accepts the packets in the correct order and sends request numbers (RN) back to the transmitting node. The effect of a given request number is to acknowledge all packets prior to the requested packet and to request transmission of the packet associated with the request number. The go back number n is a parameter that determines how many successive packets can be sent from the transmitter in the absence of a request for a new packet. Specifically, the transmitting node is not allowed to send packet i+n before i has been acknowledged (i.e., before i+1 has been requested). Thus, if i is the most recently received request from the receiving node, there is a window of n packets that the transmitter is allowed to send before receiving the next acknowledgment. In this protocol, if there is an error, the entire window must be resent as the receiving node will only permit reception of the packets in order. Thus, even if the error lies near the end of the window, the entire window must be retransmitted. This protocol is most suitable for large scaled networks having high probabilities of error.

In an architecture that permits large data packets, unnecessarily retransmitting excess packets can become a significant efficiency concern. For example, retransmitting an entire window of data packets, each on the order of 4 Gigabytes, would be relatively inefficient.

Other known flow control protocols require retransmission of only the packet received in error. This requires the receiver to maintain a buffer of the correctly received packets and to reorder them upon successful receipt of the retransmitted packet. While keeping the bandwidth requirements to a minimum, this protocol significantly complicates the receiver design as compared to that required by Go Back n ARQ.

The present invention is therefore directed to the problem of developing a method and apparatus for controlling the flow of data between nodes in a system area network that improves the efficiency of the communication without overly complicating the processing at the receiving end.

SUMMARY OF THE INVENTION

The present invention provides a method for transmitting data in a network from a source node to a destination node. According to the method of the present invention, data packets are transmitted from the source node to at least one intermediary point. Each of the packets is assigned a corresponding sequence number by the source node.

A copy of each packet is retained in a buffer at the source node until an acknowledgment is received that the packet was successfully received by an intermediary point. At the intermediary point, an intermediate point sequence number is assigned to each packet received by the intermediary point.

The present invention provides an apparatus for communicating data between two links of a fabric made of multiple links. The apparatus includes two switches and a buffer. The first switch is disposed in a first point of a link and transmits the data packets from the first point in the link to a second point in the link. The first switch assigns first point sequence numbers to the packets, which first point sequence numbers are independent from source sequence numbers assigned by a source of the packets. The buffer disposed in the first point, is coupled to the first switch and stores each packet until receiving either an acknowledgment that the packet was successfully received or an error indication that a received version of the packet included at least one error. The second switch is disposed in the second point, receives each of the transmitted data packets, and upon receipt of an error free packet sends an acknowledgment to indicate successful receipt of the error free packet and all packets in sequence between a last acknowledged packet and the error free packet. The second switch also assigns second point sequence number to all received packets, which second point sequence numbers are independent from the first point sequence numbers.

DETAILED DESCRIPTION

Architectural Overview

Next Generation Input/Output (NG I/O) Architecture is a general term to describe systems that are based on the concepts of NG I/O and that employ an NG I/O fabric. The NG I/O fabric is the set of wires and switches that allow two NG I/O devices to communicate. The NG I/O fabric is a standard interface designed to connect server nodes into a cluster and to connect various I/O devices, such as storage devices, bridges, and network interfaces. One or more NG I/O "switches," together with a series of links, comprise a "fabric."

An NG I/O link is the wires used to interconnect two points and the accompanying protocol that runs over those wires. An I/O pass through is a method of connecting I/O devices to a computer node, or connecting two computer nodes together, based on load/store memory transactions. An interconnect based on I/O pass through is transparent to the entities at either end of the interconnect. NG I/O (physical) is a minimum set of wires and the protocol that runs on the link that interconnects two entities. For example, the wires and protocol connecting a computer node to a switch comprise a link. NG I/O bundled refers to the capability to connect two or more NG I/O links together in parallel. Such bundled links can be used to gain increased bandwidth or improve the overall reliability of a given link. According to the present invention, a switch is defined as any device that is capable of receiving packets (also referred to as I/O packets) through one or more ports and re-transmitting those packets through another port based on a destination address contained in the packet. In network terms, a switch typically operates at the data link layer of the Open Systems Interconnection (OSI).

Figure 1:
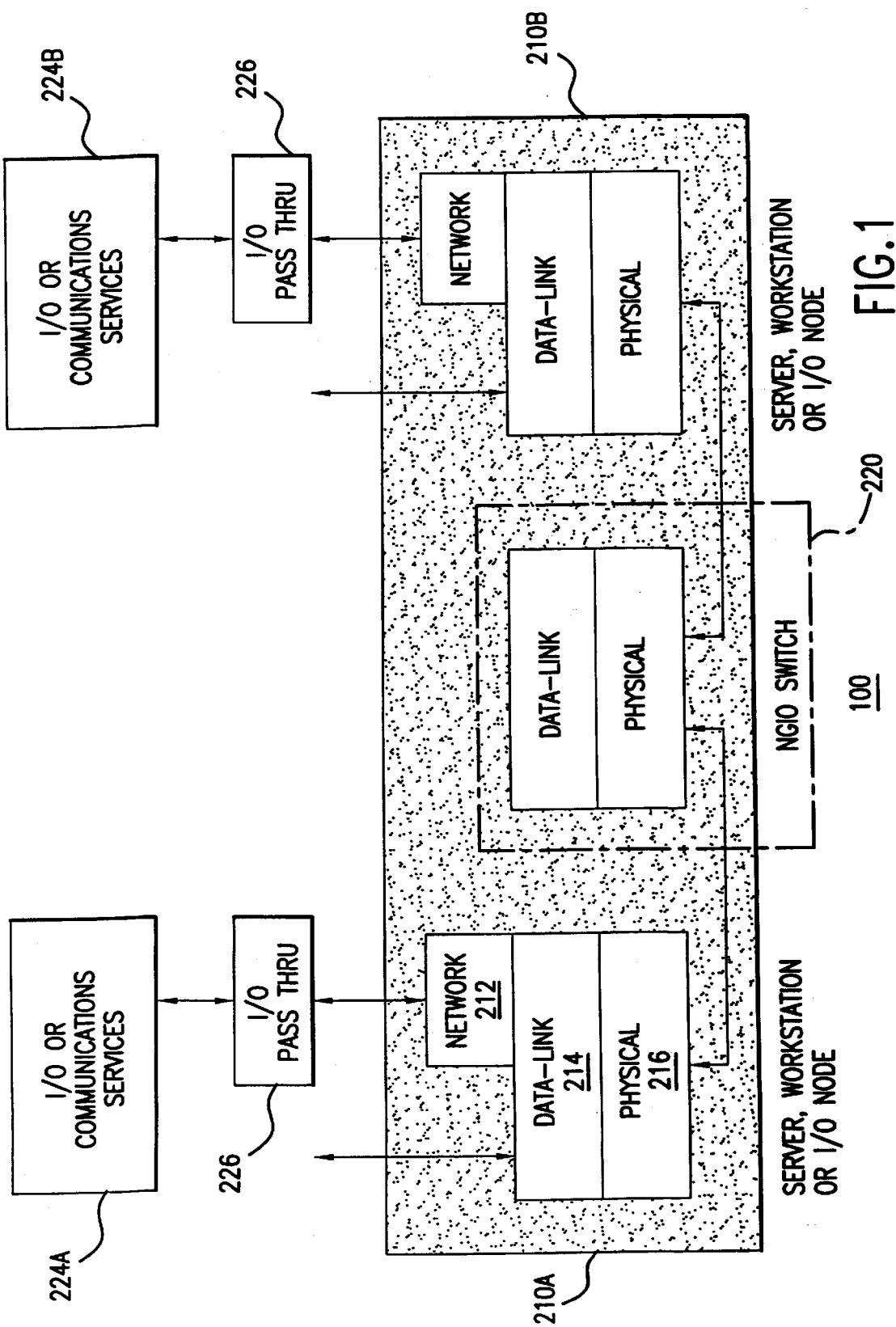
FIG. 1 illustrates an overall NG I/O link architecture according to one exemplary embodiment of the present invention.

FIG. 1 illustrates the overall NG I/O link architecture according to an exemplary embodiment of the present invention. The overall NG I/O link architecture can be illustrated as including one or more computers 210 (e.g., servers, workstations, personal computers, or the like), including computers 210A and 210B. The computers 210 communicate with each other via a switched NG I/O fabric that may include a layered architecture, including a network layer 212, a data link layer 214 and a physical layer 216. An NG I/O switch 220 (e.g., including data link and physical layers) interconnects the computers 210A and 210B. Each computer 210 can communicate with one or more I/O devices 224 (224A and 224B) via the NG I/O fabric using, for example, an I/O pass through technique 226 according to the present invention and described in greater detail below. Each computer 210 can communicate with one or more I/O devices 224 (224A and 224B), alternatively using a distributed message passing technique (DMP). As a result, I/O devices 224 may be remotely located from each computer 210.

Figure 2:
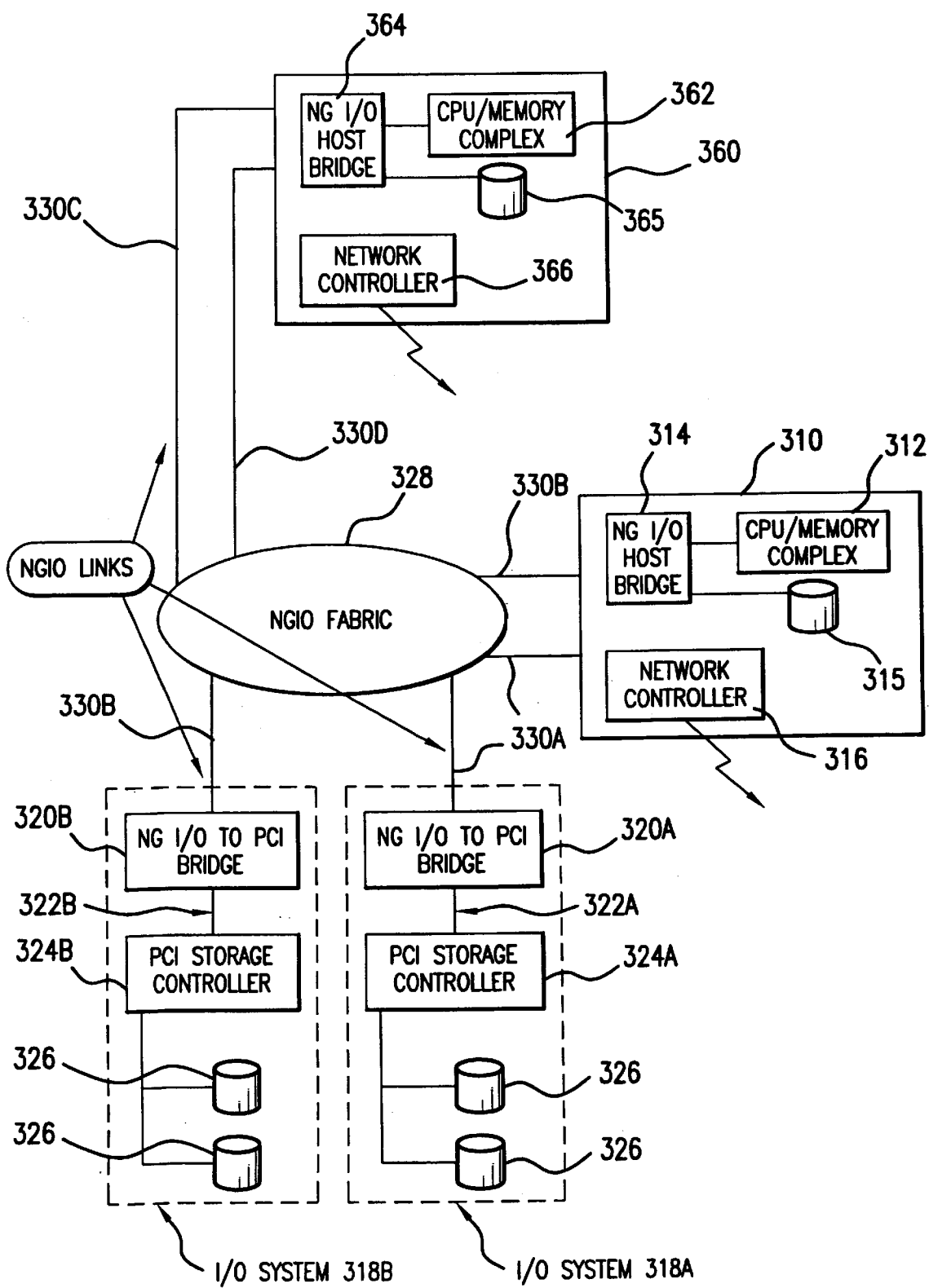
FIG. 2 is a block diagram of an NG I/O architecture for I/O pass through according to one exemplary embodiment of the present invention.

FIG. 2 is a block diagram of an NG I/O architecture for I/O pass through according to an embodiment of the present invention. The NG I/O architecture includes a computer 310 and a computer 360, each which may be a server, workstation, personal computer (PC) or other computer. Computers 310 and 360 operate as host devices. Computers 310 and 360 are each interconnected to I/O systems 318A and 318B via a switched NG I/O fabric 328, including one or more NG I/O links (e.g., NG I/O links 330A 330B, 330C, 330D). I/O systems 318 can be remotely located from computers 310 and 360.

Computer 310 includes a CPU/memory complex 312 (including a CPU and main memory typically interconnected via a host bus, not shown), an NG I/O host bridge 314, secondary memory 315 (such as a hard disk drive), and a network controller 316. For outbound transactions (e.g., information being sent from computer 310 to an I/O system 318), NG I/O host bridge 314 operates to wrap the host transaction in a NG I/O packet for transmission over the NG I/O fabric 328. For inbound transactions (e.g., information being sent from an I/O system 318 to computer 310), NG I/O host bridge 314 operates to unwrap the data (e.g., the PCI transaction) provided in an NG I/O packet over fabric 328, and then convert the unwrapped data (e.g., the PCI transaction) to a host transaction. Like computer 310, computer 360 includes a CPU/memory complex 362, NG I/O host bridge 364, a secondary memory 365, and a network controller 366. Computer 360 operates in a similar manner to computer 310.

Each I/O system 318 includes an NG I/O to PCI Bridge 320, a PCI storage controller 324 coupled to the NG I/O to PCI bridge 320 via a PCI bus 322, and one or more I/O devices 326. (As illustrated in FIG. 2, the A suffix identifies components for I/O system 318A, and the B suffix indicates corresponding components of I/O system 318B). For outbound transactions, the NG I/O to PCI Bridge 320 operates to unwrap the data of a NG I/O packet received over the NG I/O fabric 328, and then convert the unwrapped data (e.g, a host transaction or data) to a PCI transaction. Likewise, for inbound transactions, NG I/O to PCI Bridge 320 operates to wrap the PCI transaction in a NG I/O packet for transmission over the NG I/O fabric 328 to computer 310.

PCI storage controller 324 operates to control and coordinate the transmission and reception of PCI transactions between PCI bus 322 and I/O devices 326. I/O devices 326 can include, for example, a SCSI storage device, or other I/O device.

While the embodiment of the NG I/O architecture of the present invention illustrated in FIG. 2 includes an NG I/O to PCI bridge 320, it should be understood by those skilled in the art that other types of bridges can be used. For example, generically speaking, bridge 320 can be referred to as a "network to peripheral bridge" for converting network packets to and from a format that is compatible with bus 322 (bus 322 may be a wide variety of types of I/O or peripheral buses, such as a PCI bus). Likewise, PCI storage controller 324 can be generically referred to as a "peripheral storage controller" for any of several types of I/O devices. Therefore, the present invention is not limited to PCI bridges, but rather, is applicable to a wide variety of other I/O buses, such as Industry Standard Architecture (ISA), Extended Industry Standard Architecture (EISA), Accelerated Graphics Port (AGP), etc. PCI is merely used as an example to describe the principles of the present invention. Similarly, NG I/O to host bridge 364 can be generically referred to as a "network to host bridge" because it converts (NG I/O) network packets to and from a host format (host transactions).

FIG. 2 illustrates that an NG I/O fabric 328 can be used to move storage devices out of the server cabinet and place the storage devices remote from the computer 310. Fabric 328 can include one or more point-to-point links between computer 410 and each I/O system 418, or can include a number of point-to-point links interconnected by one or more switches. This architecture permits a more distributed environment than presently available.

The present invention provides a simple means to create a working network with flow control mechanisms which do not allow for lost data due to congestion and transient bit errors due to internal or external system noise. The present invention uses an approach to flow control that does not require end-to-end or link-to-link credits, rather the present invention combines the ability to detect a corrupted or out of order packets and retry (resend) any/all packets to maintain that all data is delivered uncorrupted, without losing any data and in the order that the data was sent. This is accomplished by assigning a sequence number and calculating a 32 bit Cyclic Redundancy Check (CRC) with each packet and acknowledging (ACK) or negative acknowledging (NAK) each packet.

Figure 3:
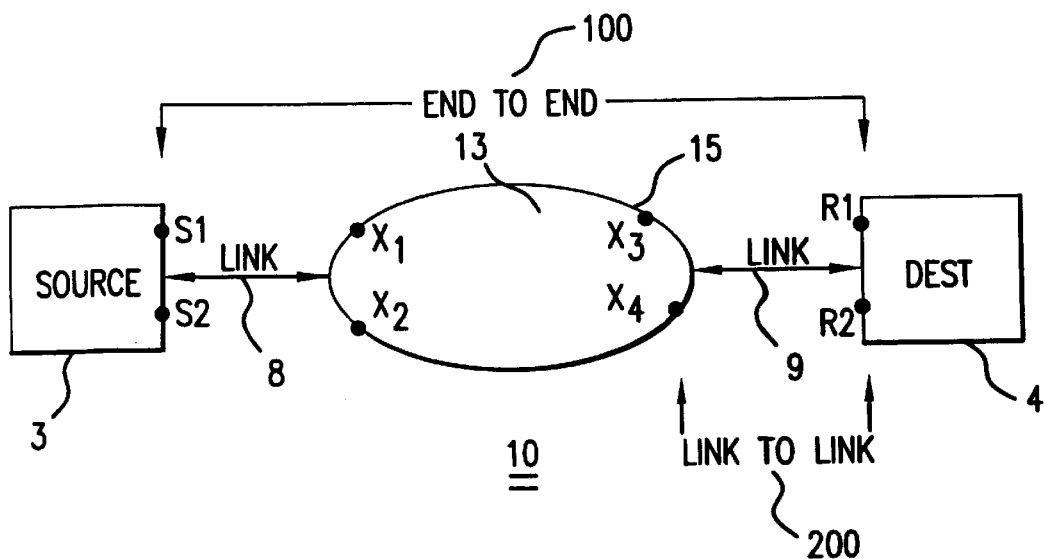
FIG. 3 illustrates the point-based protocol operation according to the present invention.

The present invention assumes a network built out of point-to-point links. Referring to FIG. 3, the minimum sized network 10 is two endpoints 3 and 4 connected via a fabric 15. For simplicity, the two endpoints in the network 3 and 4 are named the source and the destination, respectively, and will be used to describe the present invention, noting that the present invention holds for any unlimited sized network. Fabric 15 includes a switch 13 and links 8 and 9. Link 8 connects the source to switch 13 and link 9 connects the destination with switch 13. As stated above, the NG I/O protocol operates point-to-point and not end-to-end 100 as shown.

The present invention assumes a send queue and receive queue at each endpoint (i.e., at the source, there is a send queue SE1 and a receive queue RE1 and at the destination, there is a send queue SE2 and a receive queue RE2) and a send and receive queue at each link-switch connection in fabric 13 (i.e., at the link-switch connection for link 8, there is a send queue X1 and a receive queue X2 and at the link-switch connection for link 9, there is a send queue X3 and a receiver queue X4). The size of the send queue SEI need not match the size of the receive queue X2, nor does the send queue X1 need to match the size of receiver queue RE1. This is also true for send and receive queues to and from destination 4 and the link-switch connection for link 9. In general, send queues will be larger than receive queues (however, this is not required for purposes of the present invention). In this example, the size of send queue SE1 at the source is defined as S1, the size of receive queue RE1 at the source is defined as S2, the size of send queue SE2 at the destination is defined as R1, and the size of receive queue RE2 at the destination is defined as R2. In addition, send and receive queues X1–X4 have sized defined as LX1–LX4, respectively.

Source 3 is allowed to send up to S1 packets to the receive queue X1 on switch 13. Under congestion-free conditions, packets received at switch 13 will be processed and immediately passed on to destination 4. Referring back to the example in FIG. 3, switch 13 must send back an acknowledgment (ACK) notifying the source that the packets have been received correctly by the link-switch connection for link 8 by acknowledging a sequence number. Packets have a unique sequence number associated by link. On any given link, packets must arrive in the order transmitted. On any given link, descriptors are retried in the order they were queued. Note, that as an efficiency improvement to this algorithm, the link-switch for link 8 can ACK multiple packets at one time by ACKing the highest sequence number that has been correctly received, e.g., if the source 3 receives an ACK for packet #9, then receives an ACK for packet #14, packets #10–#13 are also implicitly ACKed. After the link-switch for link 8 sends an ACK that the packets have been sent correctly, link-switch for switch 9 sends the packets to destination 4. Destination 4 must ACK send back an acknowledgment to link-switch for switch 9 that the data was sent correctly. A new set of sequence numbers is assigned to the packets sent from link-switch for switch 9 to the destination.

Transient errors are errors that occur when packets are sent from a sending node to a receiving node. In the event of a transient error due to internal or external system noise, data may be corrupted between the source 3 and the destination 4. The receiver of the packets must calculate the CRC across the data received, and compare it to the CRC appended to the end of the packet. If the calculated CRC and the received CRC match, the packet will be ACKed. If the two CRC's do not match, that packet must be NAKed, again identified by the sequence number. Upon receipt of a NAK, the sender must resend the specified packet again, followed by all packets following that packet. For example, if the sender has sent packets up to sequence number 16 but receives a NAK for packet #14, it must resend packet #14, followed by packet #15 and packet #16. Note that ACKs and NAKs can still be combined. Using the example in the previous paragraph, of packet 9 is ACKed, then packets #10–#13 are assumed received in order and without data corruption, followed by packet #14 with corrupted data; a NAK of packet #14 signifies that packets #10–#13 were received without error, but that packet #14 was received with error and must be resent.

Figure 4:
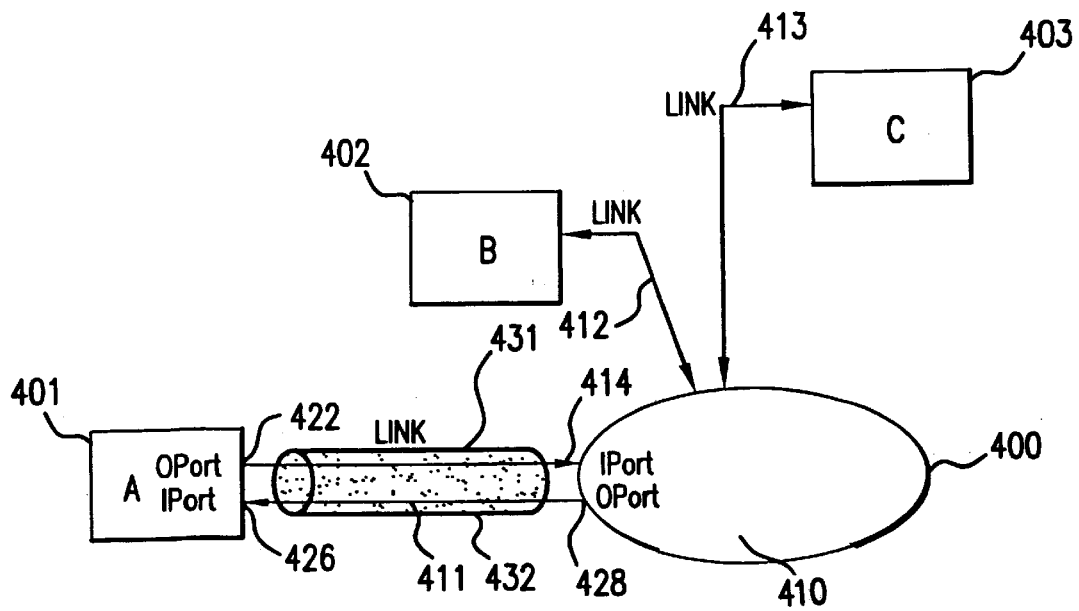
FIG. 4 illustrates the point-based protocol operation with multiple nodes according the present invention.

FIG. 4 is a block diagram illustrating NG I/O links according to an embodiment of the present invention. Fabric 400 is connected between nodes A, B and C labeled 401, 402 and 403, respectively. As shown in FIG. 4, a link 411 is disposed between node A and fabric 400, a link 412 is disposed between node B and fabric 400 and a link 413 is disposed between node B and fabric 400. Each link is a bi-directional communication path between two NG I/O connection points in the fabric 400. As shown in FIG. 4, an unidirectional path 431 of link 411 is connected between an output port 422 of node A and an input port 414 of fabric 400 and an unidirectional path 432 is connected between the input port 426 of node A and the output port 428 of fabric 400, thereby providing a bi-directional link.

Referring back to FIG. 4, suppose for example, nodes A and C desire to communicate with node B by sending packets of data to node C. According to the principles of the present invention, node A can forward packets #1–#3 across link 411 to fabric 400. These packets are assigned a sequence number which indicates the order in which the packets must be received by the receiving point or node. Node C, also wishing to communicate with node B, forwards packets #11–#12 across link 413 to fabric 400. Again, sequence numbers are assigned to these packets to ensure they are received in the order transmitted. Fabric 400 includes at least one switch 410 used to receive the transmitted packets. Switch 410 also assigns a new sequence number to all packets it receives. For instance, switch 410 assigns a new sequence number to packets #1–#3 and #11–#13. The sequence number for these packets can be arranged in more than one way as long as they follow the same sequence that the packets were sent from the transmitter to switch 410. For example, switch 410 can assign new sequence number 101–106 to packets #1–#3 and #11–#13, respectively. In addition, new sequence numbers 101–106 can be assigned to packets #1, #11, #2, #12, #3, and #13, respectively. Other assignments are possible without departing from the present invention.

According to the principle of the present invention, the identification of the source transmitting the packets is no longer needed. Thus, once the packets are sent from the source to the switch, and acknowledged by the switch, the identification of the source is no longer required. Referring back to the previous example, packets #1–#3 and #11–#13 assigned new sequence numbers 101–106, are then forwarded to node B. At node B, the packets are either ACKed or NAKed. If the packets are acknowledged, then successful data transmission has been completed. In the alternative, if a NAK has been received by the switch from node B, then the switch determines which packets must be resent. According to the features of the present invention, new sequence numbers 101–106 are used to identify the packets. Thus, a NAK for sequence number 104 signifies that packets represented by sequence numbers 101–103 were received without error but the packets represented by sequence numbers 104–106 was received with error and must be resent.

If congestion in the network occurs, received packets may not be able to immediately make progress through the network. Congestion in a network is the overcrowding of packets across the network. Congestion control and congestion management are two mechanisms available for a network to effectively deal with heavy traffic volumes. Referring back to FIG. 3, when a local buffer space is filled at a receiving queue, additional packets will be lost, e.g., when queue X1 fills up, packets that follow will be thrown away. However, given that retry can occur across each point of a network instead of each end, packets being thrown away are relatively simple to recover from. As soon as receiving queue XI starts moving packets out of its receive buffers, it opens up room for additional packets to be received. The receive queue X1 will check the sequence number of the next packet it receives. In the event that source 3 has sent packets that were dropped, the first dropped packet will be NAKed and therefore resent from that packet on.

According to the present invention, the send queue S1 just keeps sending packets until its send queue is full of packets that have not been ACKed. It must wait for an ACK for those packets before it can reuse those buffers (it needs to be able to retry those packets if necessary).

There are many advantages of the present invention. For example, the present invention allows for retry of corrupted packets at each point in the network instead of at the source and the destination of the network. According to the present invention, after a first node (source) transmits to and receives an acknowledgment from an intermediate point the first node is no longer relied upon to resend information that may be corrupted later in the transmission path from other intermediary nodes to the destination. Thus, the retry feature of the present invention simplifies data transmission and makes it more efficient. Since the first node is no longer relied upon to resend data if corruption occurs during transmission, the first node is free to send additional data to other locations or to the same destination after the first node receives an acknowledgment from the first intermediate point.

Further, the present invention also allows detection of error packets at the cell level. According to the principles of the present invention, each cell in the packet is checked for errors. Upon the detection of the first corrupt cell in a packet, an error indication is returned to the transmitter of the packet. Thus, the entire packet does not need to be checked before an error indication is returned.

Additionally, the present invention implements flow control between two points which will yield better bandwidths for link efficiency than a traditional credit based flow control—a credit base scheme stops sending packets when all credits are used up, and transmission cannot resume until additional credits are received. Therefore, in a credit based scheme the time to start and stop data transfer is dependent on the round trip time of the traversing link. The present invention is optimistic in that it sends packets with the expectation that they will be received correctly and is not dependent on the round trip time of the link.

What is claimed is:

1. A method for transmitting data in a network from a source node to a destination node comprising the steps of:

a) transmitting data in a plurality of packets from said source node to at least one intermediary point, said plurality of packets being assigned a corresponding sequence number;

b) retaining a copy of each packet in a buffer at said source node until receiving an acknowledgment that said each packet was successfully received by said intermediary point; and c) assigning an intermediate point sequence number to each packet received by the intermediate point, wherein said intermediate point sequence number is independent from said sequence number of said source node.

2. The method according to claim 1, further comprising the step of retaining a copy of each received packet in a buffer at said intermediate point until receiving another acknowledgment that said each packet was successfully received.

3. The method according to claim 1, further comprising the steps of:

d) de-allocating a particular packet in the buffer at the source node upon receipt of an acknowledgment associated with said particular packet from said intermediary node; and e) de-allocating any other packets in the buffer between said particular packet and a last acknowledged packet.

4. The method according to claim 1, further comprising the steps of:

d) retransmitting said each packet and all subsequent packets upon receipt of an error indication; and e) dropping all received packets following said each packet associated with the error indication until successfully receiving a retransmitted version of said each packet.

5. A method for transferring data across a fabric in a system area network including a plurality of links using a point to point protocol, said method comprising the steps of:

a) transmitting the data in a plurality of packets from point to point, said plurality of packets being assigned a sequence number;

b) retaining each packet in a buffer at a source node until receiving either an acknowledgment indicating that said each packet was successfully received or an error indication that a received version of said each packet included at least one error, while simultaneously transmitting additional packets;

c) using a single negative acknowledgment to indicate that a packet associated with the negative acknowledgment includes at least one error and to simultaneously indicate that all previous packets received prior to the packet associated with the negative acknowledgment were received correctly; and d) assigning a link sequence number to each of said packets before transmitting each of the packets from a origination point in a link, wherein said link sequence number is independent from said sequence number of said source node.

6. The method according to claim 5, further comprising the step of indicating successful receipt of all packets between a last acknowledged packet and a particular packet by sending said acknowledgment.

7. The method according to claim 5, further comprising the steps of:

e) de-allocating a particular packet in the buffer at the source node upon receipt of an acknowledgment associated with said particular packet; and f) de-allocating any other packets in the buffer between said particular packet and a last acknowledged packet.

8. The method according to claim 5, further comprising the step of de-allocating all buffered packets following a packet associated with the negative acknowledgment, and retransmitting all packets from the packet associated with the negative acknowledgment including the packet associated with the negative acknowledgment.

9. An apparatus for communicating data between two links of a fabric including a plurality of links, said apparatus comprising:

a) a first switch being disposed in a first point of a link and transmitting the data in a plurality of packets from the first point in the link to a second point in the link; said first switch assigning first point sequence numbers to the plurality of packets, said first point sequence numbers being independent from source sequence numbers assigned by a source of the packets;

b) a buffer being disposed in the first point, being coupled to the first switch and storing each packet until receiving either an acknowledgment that said each packet was successfully received or an error indication that a received version of said each packet included at least one error; and c) a second switch being disposed in the second point, receiving each of the transmitted data packets, and upon receipt of an error free packet sending another acknowledgment to indicate successful receipt of said error free packet and all packets in sequence between a last acknowledged packet and said error free packet, said second switch assigning second point sequence number to said received packets, said second point sequence numbers being independent from said first point sequence numbers.

10. The apparatus according to claim 9, wherein the first switch deallocates said stored packet in the buffer upon receipt of an acknowledgment associated with said packet in the buffer in addition to all packets preceding said packet in the buffer.

11. The apparatus according to claim 9, wherein the first switch retransmits a particular packet and all packets in sequence subsequent to the particular packet upon receipt of an error indication associated with said particular packet.

12. The apparatus according to claim 11, wherein said second switch drops all received packets in sequence following said particular packet until successfully receiving a retransmitted version of said particular packet.

13. A program storage device readable by a machine, tangibly embodying a program of instructions executable by a machine to perform a method having a series of steps for transmitting data between switches in a fabric having a plurality of links, said method comprising the steps of:

a) transmitting data in a plurality of packets from a source switch to at least one intermediary switch, said plurality of packets being assigned a corresponding sequence number by the source switch;

b) retaining a copy of each packet in a buffer at said source switch until receiving an acknowledgment that said each packet was successfully received by said intermediary switch; and c) assigning an intermediate switch sequence number to each packet received by the intermediate switch wherein said intermediate switch sequence number is independent of said sequence number of said sequence number of said source switch.

14. The device according to claim 13, wherein the method further comprises the step of retaining a copy of each transmitted packet in a buffer at said intermediate switch until receiving an acknowledgment that said each packet was successfully received.

15. The device according to claim 13, wherein the method further comprises the steps of:

d) de-allocating a particular packet in the buffer at the source switch upon receipt of an acknowledgment associated with said particular packet from said intermediary switch; and e) de-allocating any other packets in the buffer between said particular packet and a last acknowledged packet.

16. The device according to claim 13, wherein the method further comprises the steps of:

d) retransmitting said each packet and all subsequent packets upon receipt of an error indication; and e) dropping all received packets following said each packet associated with the error indication until successfully receiving a retransmitted version of said each packet.

17. A program storage device readable by a machine, tangibly embodying a program of instructions executable by a machine to perform a method having a series steps for transmitting data between switches in a fabric having a plurality of links, said method comprising the steps of:

a) transmitting the data in a plurality of packets from a first switch to a second switch, said plurality of packets being assigned a sequence number by the first switch;

b) retaining each packet in a buffer at the first switch until receiving either an acknowledgment indicating that said each packet was successfully received or an error indication that a received version of said each packet included at least one error, while simultaneously transmitting additional packets;

c) using a single negative acknowledgment to indicate that a packet associated with the negative acknowledgment includes at least one error and to simultaneously indicate that all previous packets received prior to the packet associated with the negative acknowledgment were received correctly; and d) assigning a link sequence number to each of said packets before transmitting each of the packets from a second switch, said link sequence number assigned by the second switch being independent of the link sequence number assigned by the first switch.

18. The device according to claim 17, wherein the method further comprises the step of indicating successful receipt of all packets between a last acknowledged packet and a particular packet by sending a single acknowledgment.

19. The device according to claim 17, wherein the method further comprises the steps of:

e) de-allocating a particular packet in the buffer at the first switch upon receipt of an acknowledgment associated with said particular packet; and f) de-allocating any other packets in the buffer between said particular packet and a last acknowledged packet.

20. The device according to claim 17, further comprising the step of de-allocating all buffered packets following a packet associated with the negative acknowledgment, and retransmitting all packets from the packet associated with the negative acknowledgment including the packet associated with the negative acknowledgment.

* * * * *

UNITED STATES PATENT AND TRADEMARK OFFICE
CERTIFICATE OF CORRECTION

PATENT NO. : 6,181,704 B1
DATED : January 30, 2001
INVENTOR(S) : Ken Drottar; David S. Dunning; Donald F. Cameron It is certified that error appears in the above-identified patent and that said Letters Patent is hereby corrected as shown below:

Column 6,
Line 50, "C" should be -- B --

Column 7,
Line 5, "principle" should be -- principles --

Column 10,
Line 50, "series steps" should be -- series of steps --

Signed and Sealed this

Twenty-seventh Day of November, 2001

Attest:

*Nicholas P. Godici*

NICHOLAS P. GODICI
*Attesting Officer*     *Acting Director of the United States Patent and Trademark Office*